United States Patent
Ushiyama et al.

[19]

[11] Patent Number: 6,141,150

[45] Date of Patent: Oct. 31, 2000

[54] DICHROIC PRISM, PRISM UNIT, AND PROJECTION DISPLAY APPARATUS

[75] Inventors: Tomiyoshi Ushiyama, Minowa-machi; Akitaka Yajima, Tatsuno-machi; Yasunori Ogawa, Suwa, all of Japan

[73] Assignee: Seiko Epson Corporation, Tokyo, Japan

[21] Appl. No.: 09/117,645

[22] PCT Filed: Dec. 8, 1997

[86] PCT No.: PCT/JP97/04507

§ 371 Date: Aug. 3, 1998

§ 102(e) Date: Aug. 3, 1998

[30] Foreign Application Priority Data

Dec. 6, 1919 [JP] Japan ................................. 8-342690

[51] Int. Cl.⁷ .................................................. G02B 27/10
[52] U.S. Cl. .................. 359/618; 359/629; 359/634; 359/831; 359/834; 353/31; 353/81
[58] Field of Search ........................ 359/621, 618, 359/629, 634, 496, 831, 833, 834; 353/31, 34, 81

[56] References Cited

U.S. PATENT DOCUMENTS

| | | | |
|---|---|---|---|
| 5,221,998 | 6/1993 | Sugahara .................... | 359/831 |
| 5,743,610 | 4/1998 | Yajima et al. ............... | 353/31 |
| 5,909,944 | 6/1999 | Yajima et al. ............... | 353/81 |

FOREIGN PATENT DOCUMENTS

| | | |
|---|---|---|
| 39-20049 | 9/1964 | Japan . |
| 60-169601 | 11/1985 | Japan . |
| 62-161101 | 7/1987 | Japan . |
| 3-138603 | 6/1991 | Japan . |
| 7-35908 | 2/1995 | Japan . |
| 7-294845 | 11/1995 | Japan . |
| 8-184797 | 7/1996 | Japan . |
| 8-184798 | 7/1996 | Japan . |

*Primary Examiner*—Loha Ben
*Attorney, Agent, or Firm*—Oliff & Berridge, PLC

[57] ABSTRACT

At least one of four rectangular prisms in a dichroic prism is made longer than the other rectangular prisms. Parts of the rectangular surfaces of the long rectangular prisms partially protrude from the rectangular surfaces of the other rectangular prisms in the longitudinal direction. The protruding parts of the rectangular surfaces of the long rectangular prisms are not provided with a dichroic film. Such a construction makes it possible to prevent return light, which returns from the light emitting surface side of the dichroic prism and the dichroic prism, from emitting again from the light emitting surface.

20 Claims, 14 Drawing Sheets

DICHROIC PRISM, PRISM UNIT, AND PROJECTION DISPLAY APPARATUS

BACKGROUND OF THE INVENTION

1. Field of Invention

The present invention relates to a dichroic prism, a prism unit thereof, and a projection display apparatus.

2. Description of Related Art

Most projection display apparatuses for projecting a color image onto a projection screen utilize a dichroic prism. A dichroic prism is an optical element that synthesizes and emits lights of three colors, red, green, and blue, in the same direction.

FIG. 13 is a conceptual view showing the principal part of a projection display apparatus. This projection display apparatus includes three liquid crystal light valves 42, 44, and 46, a dichroic prism 48, and a projection lens 50. Red reflecting films 48R and blue reflecting films 48B are located in the form of a cross in the center of the dichroic prism 48. The dichroic prism 48 synthesizes lights of three colors, red, green, and blue that are modulated by the three liquid crystal light valves 42, 44, and 46, and emits the lights toward the projection lens 50. The projection lens 50 focuses the synthesized lights onto a projection screen 52.

A general type of dichroic prism is made by bonding rectangular surfaces of four rectangular prisms that are equal in size. The red reflecting films 48R are previously formed on predetermined rectangular surfaces of two rectangular prisms so that they form a flat plane when four rectangular prisms are bonded together. The blue reflecting films 48B are also previously formed on predetermined rectangular surfaces of two rectangular prisms in a similar manner. In making a dichroic prism by bonding four rectangular prisms of equal size, however, it is very difficult to accurately bond the rectangular prisms so that the red reflecting films 48R form a flat plane and the blue reflecting films 48B form a flat plane.

Accordingly, in order to accurately bond rectangular prisms together, it is well known to make some of the rectangular prisms longer than the others, as shown in, for example, FIG. 1 of Japanese Unexamined Patent Publication No. 7-294845.

FIGS. 14(A) and 14(B) are explanatory views showing problems of such a conventional dichroic prism. As shown in FIG. 14(A), a dichroic prism 48 includes two rectangular prisms 61 and 62 that are long in the longitudinal direction (also referred to as "a long rectangular prism pair"), and two rectangular prisms 63 and 64 that are short in the longitudinal direction (also referred to as "a short rectangular prism pair"). Blue reflecting films 48B are formed on interface surfaces between the long rectangular prism pair 61 and 62 and the short rectangular prism pair 63 and 64. Rectangular surfaces of the long rectangular prism pair 61 and 62 are partly exposed, and the blue reflecting films 48B are also formed on the exposed surfaces. Moreover, red reflecting films are formed on an interface surface between the long rectangular prism pair 61 and 62, and on an interface surface between the short rectangular prism pair 63 and 64, respectively.

In a projection display apparatus, there is light that returns from a projection lens 50 toward the dichroic prism 48 because of reflection by the projection lens 50, or the like. A description will now be given of a case in which white return light W is produced in the example shown in FIGS. 14(A) and 14(B). FIG. 14(B) is a horizontal sectional view of protruding portions of the long rectangular prism pair 61 and 62 at the top thereof. When the return light W enters a protruding rectangular surface of the rectangular prism 61 (a surface provided with the blue reflecting film 48B), it is totally reflected by the rectangular surface. Only red light R of the totally reflected return light W is reflected by the red reflecting film 48R, and is emitted again toward the projection lens 50.

In the conventional dichroic prism shown in FIGS. 14(A) and 14(B), the return light, which returns from the light emitting surface side to the dichroic prism, is thus reflected inside the dichroic prism and is emitted again from the light emitting surface. Consequently, the influence of this return light is exerted on an image to be reproduced by light emitted from the dichroic prism.

SUMMARY OF THE INVENTION

The present invention has been made to solve the above problem of the related art, and it is an object of the present invention to prevent return light, which returns from the light emitting surface side of a dichroic prism to the dichroic prism, from emitting again from the light emitting surface.

In order to at least partially solve the above-mentioned problem, a first embodiment provides a dichroic prism composed of four rectangular prisms with their rectangular surfaces bonded together, wherein at least one of the four rectangular prisms is longer than the other rectangular prisms, so that a part of the rectangular surface of the long rectangular prism protrudes from the rectangular surfaces of the other rectangular prisms in the longitudinal direction, and wherein a dichroic film is formed on a part of the rectangular surface of the long rectangular prism other than the protruding part.

Since this makes it possible to prevent return light from being reflected by a dichroic film on the protruding part, it is possible to prevent return light from emitting again from the light emitting surface.

A second embodiment provides a dichroic prism composed of four rectangular prisms with their rectangular surfaces bonded together, wherein a first rectangular prism pair composed of adjoining two of the four rectangular prisms is longer than the other second rectangular prism pair, so that a part of the rectangular surface of the first rectangular prism pair protrudes from the rectangular surface of the second rectangular prism pair in the longitudinal direction, and wherein a dichroic film is formed on a part of the rectangular surface of the first rectangular prism pair other than the protruding part.

Since the second embodiment also makes it possible to prevent return light from being reflected by a dichroic film on the protruding part, it is possible to prevent return light from emitting again from the light emitting surface.

In the above first or second embodiment, it is preferable that the two rectangular prisms in the first rectangular prism pair be fixed in a state shifted from each other in the longitudinal direction so that they form a step.

This makes it possible to precisely position the center axis of the dichroic prism with the use of the step, and furthermore, to precisely position the reflecting surfaces of the rectangular prisms in the same plane.

In the above first or second embodiment, it is preferable that the rectangular surface at the step of the first rectangular prism pair be provided with a light diffusing layer for diffusing light. This makes it possible to prevent return light from being totally reflected by the step of the protruding part.

The light diffusing layer may be an adhesive layer or a ground glass layer. This ground glass layer may be formed by omitting to grind a part of the rectangular surface of the rectangular prism that is to be provided with the light diffusing layer.

A third embodiment provides a prism unit comprising a dichroic prism of the first or second embodiment, and a prism stand for mounting the dichroic prism thereon, wherein the prism stand has a step that matches the step of the dichroic prism.

The use of such a prism unit makes it possible to easily mount the dichroic prism of the first or second embodiment in another apparatus.

A fourth embodiment provides a projection display apparatus comprising an illumination optical system for emitting illumination light, colored light separation means for separating the illumination light into lights of three colors, three light modulation means for modulating the three colored lights based on a given image signal, a dichroic prism of the first or second embodiment, and a projection optical system for projecting the lights synthesized by the dichroic prism.

In the projection display apparatus of the fourth embodiment, return light that returns from the projection optical system to the dichroic prism can be prevented from being reflected inside the dichroic prism and emitting again from the light emitting surface. As a result, it is possible to prevent an image to be reproduced by light projected from the projection optical system from being affected by the return light.

DETAILED DESCRIPTION OF PREFERRED EMBODIMENTS

Figure 1A:
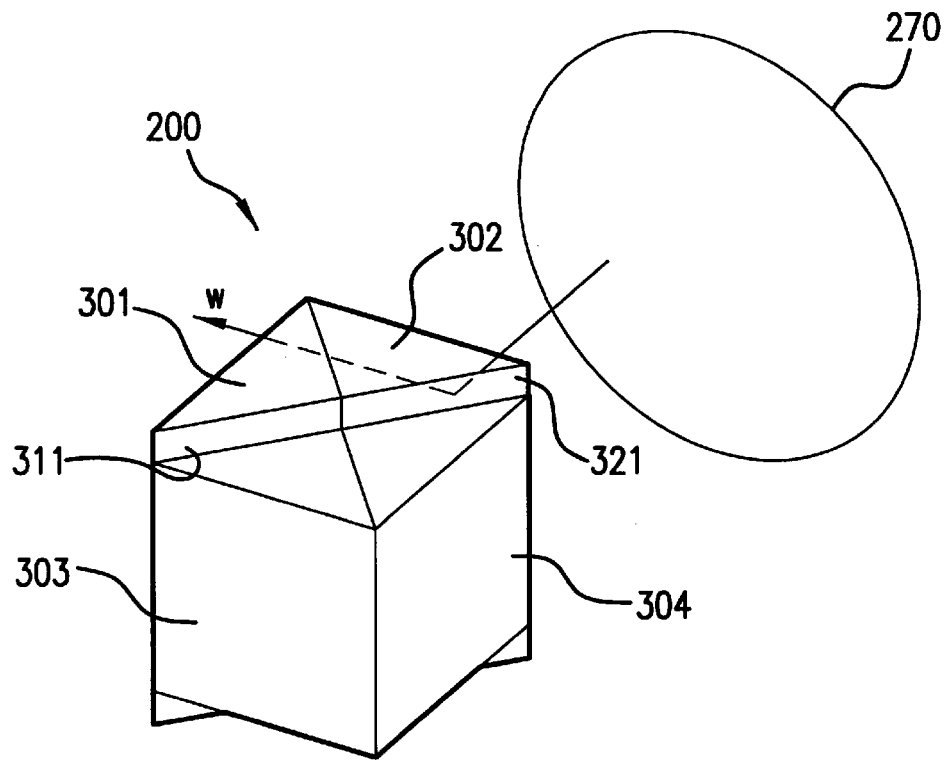
FIGS. 1(A) and 1(B) are explanatory views of a dichroic prism 200 according to a first embodiment of the present invention.
Figure 1B:
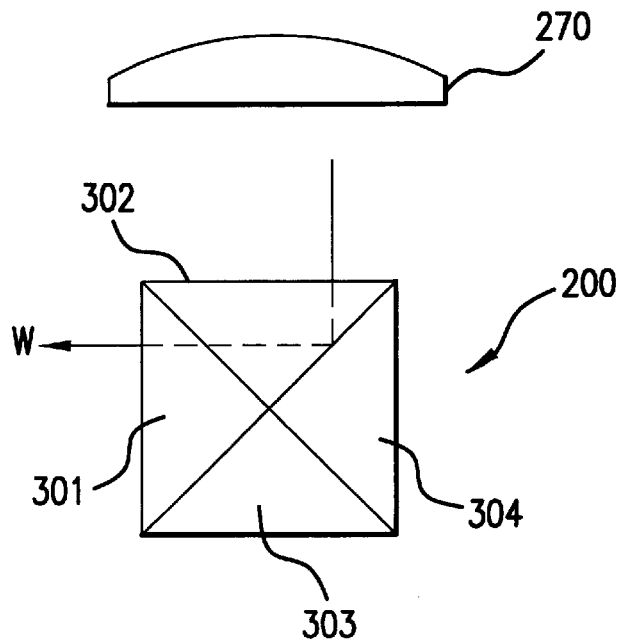

A. First Embodiment:

Next, modes for carrying out the present invention will be described according to the embodiments. FIGS. 1(A) and 1(B) are explanatory views of a dichroic prism 200 according to a first embodiment of the present invention. As shown in FIG. 1(A), this dichroic prism 200 includes two adjoining long rectangular prisms 301 and 302 (also referred to as "a long rectangular prism pair"), and two adjoining short rectangular prisms 303 and 304 (also referred to as "a short rectangular prism pair"). The two long rectangular prisms 301 and 302 are shaped like rectangular triangular prisms that are equal in length (in the longitudinal direction). The two short rectangular prisms 303 and 304 are also shaped like rectangular triangular prisms that are equal in length. The short rectangular prism pair 303 and 304 are bonded to almost the center of the long rectangular prism pair 301 and 303 in the longitudinal direction. That is, the long rectangular prism pair 301 and 302 protrude from the top and bottom of the short rectangular prism pair 301 and 302 by an almost equal length.

Figure 2A:
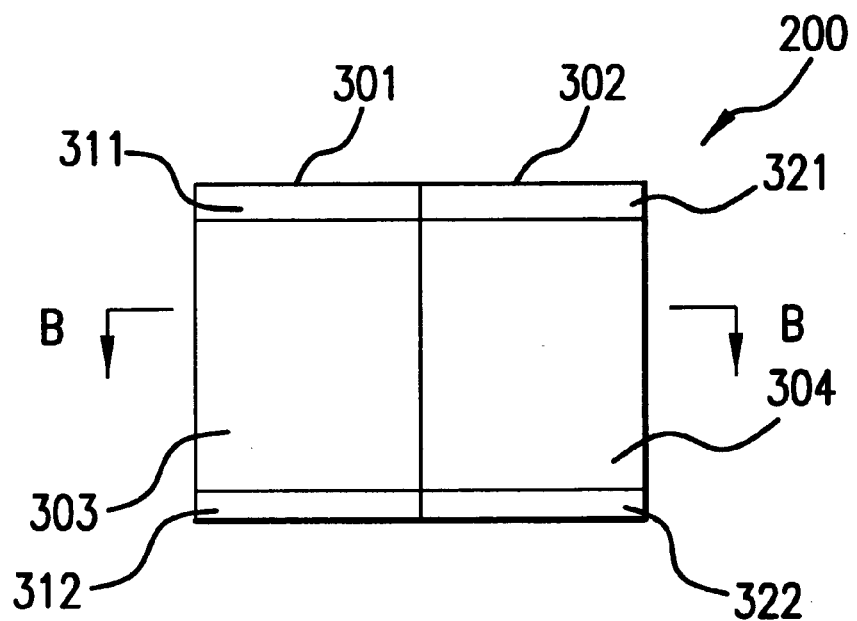
FIGS. 2(A) and 2(B) are a front view of the dichroic prism 200 of the first embodiment, and a cross-sectional view taken along line B—B in the front view.
Figure 2B:
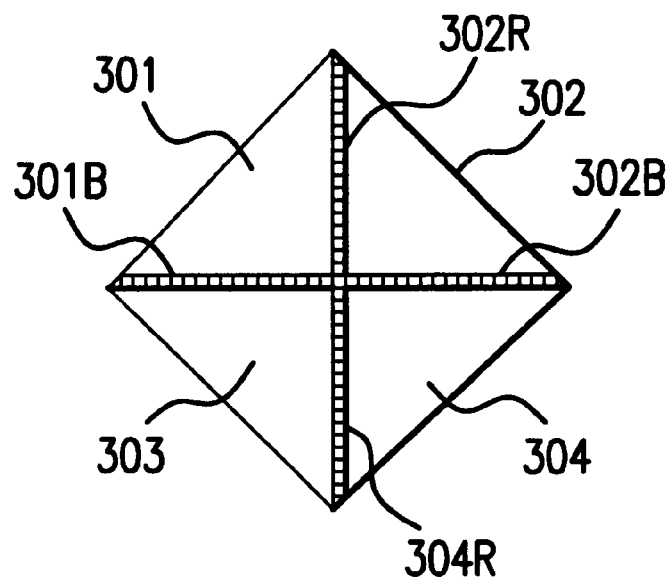

FIG. 2(A) is a front view of the dichroic prism 200 according to the first embodiment, and FIG. 2(B) is a cross-sectional view taken along line B—B in FIG. 2(A). As shown in FIG. 2(B), blue reflecting films 301B and 302B are formed on an interface surface between the long rectangular prism pair 301 and 302 and the short rectangular prism pair 303 and 304. Furthermore, red reflecting films 302R and 304R are formed on an interface surface between the long rectangular prism pair 301 and 302 and on an interface surface between the short rectangular prism pair 303 and 304, respectively.

Figure 3A:
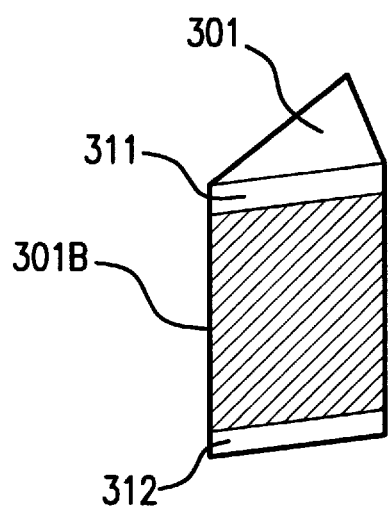
FIGS. 3(A) to 3(D) are perspective views of four rectangular prisms 301 to 304 that constitute the dichroic prism 200 of the first embodiment.

FIGS. 3(A) to 3(D) are perspective views of the four rectangular prisms 301 to 304 that constitute the dichroic prism 200 of the first embodiment. As shown in FIG. 3(A), the blue reflecting film 301B is formed on one of two rectangular surfaces of the first rectangular prism 301 that serves as an interface surface between the first rectangular prism 301 and the third rectangular prism 303, providing that exposed surfaces 311 and 312 protruding from the short rectangular prism pair 303 and 304 are not provided with the blue reflecting film 301B, and are ground to flat ground surfaces. The other rectangular surface of the first rectangular prism 301 is also not provided with any reflecting film, and is ground to a flat ground surface.

Figure 3B:
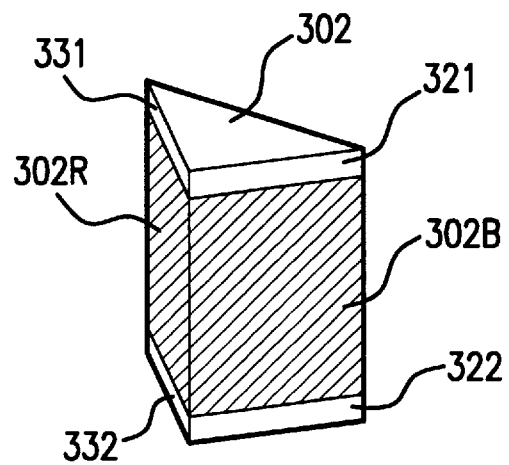

As shown in FIG. 3(B), the blue reflecting film 302B is formed on one of two rectangular surfaces of the second rectangular prism 302 that serves as an interface surface between the second rectangular prism 302 and the fourth rectangular prism 304, providing that exposed surfaces 321 and 322 protruding from the short rectangular prism pair 303 and 304 are not provided with the blue reflecting film 301B and are ground to flat ground surfaces. The other rectangular surface of the second rectangular prism 302 (i.e., the surface serving as an interface surface between the second rectangular prism 302 and the first rectangular prism 301) is provided with the red reflecting film 302R, providing that surface portions 331 and 332 protruding from the short rectangular prism pair 303 and 304 are not provided with the red reflecting film 302R, and are ground to flat ground surfaces.

Figure 3C:
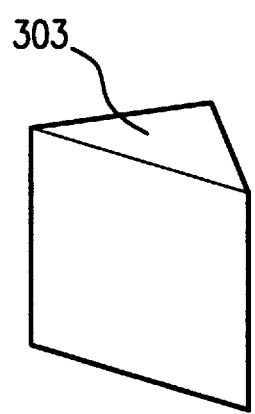
Figure 3D:
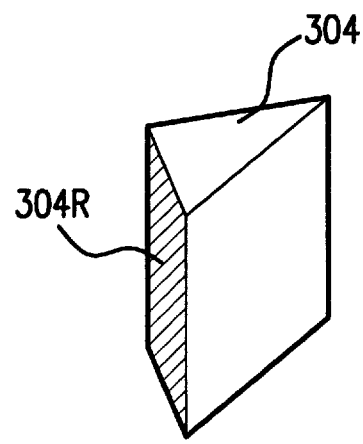

The two rectangular surfaces of the third rectangular prism 303 (FIG. 3(C)) are not provided with reflecting films (dichroic films), and are ground to flat ground surfaces. One of the two rectangular surfaces of the fourth rectangular prism 304 (FIG. 3(D)), which serves as an interface surface between the fourth rectangular prism 304 and the third rectangular prism 303, is entirely provided with the red reflecting film 304R. The other rectangular surface of the fourth rectangular prism 304 is not provided with any reflecting film (dichroic film), and is ground to a flat ground surface.

As shown in FIGS. 3(A) and 3(B), the reflecting films 301B, 302B, and 302R are formed only on the parts of the rectangular surfaces of the long rectangular prism pair 301 and 302 that overlap with the short rectangular prism pair 303 and 304. In other words, the portions 311, 312, 321, 322, 331, and 332 protruding from the top and bottom of the short rectangular prism pair 303 and 304 are not provided with any reflecting films (dichroic films).

The reflecting film (dichroic film) is generally formed by evaporating a dielectric multilayer film. The dichroic prism 200 shown in FIG. 1 can be produced by bonding the thus prepared four rectangular prisms 301 to 304 with an adhesive. A method of assembling the dichroic prism of the embodiment will be described later in detail.

FIGS. 1(A) and 1(B) also show the optical path of white return light W that enters the protruding portions of the long rectangular prism pair 301 and 302. FIG. 1(B) is a horizontal sectional view of the protruding portions of the long rectangular prism pair 301 and 302. When the return light W from a projection lens 270 is incident on the protruding rectangular surface of the second rectangular prism 302 (the exposed surface 321), it is totally reflected thereby. Since the interface surfaces between the protruding portions of the long rectangular prism pair 301 and 302 (the surfaces 331 and 332 shown in FIG. 3(B)) are not provided with a red reflecting film, the return light W totally reflected by the exposed surface 321 shown in FIG. 1(A) travels straight and unchanged through the interface surface between the long rectangular prism pair 301 and 302, passes through the first rectangular prism 301, and then, emerges.

In this way, in the dichroic prism 200 of the first embodiment, the return light W from the projection lens 270 does not emit again from the light emitting surface of the dichroic prism 200 (i.e., the light emitting surface of the second rectangular prism 302). As a result, it is possible to avoid a phenomenon in which return light affects an image to be reproduced by light emitted from the light emitting surface of the dichroic prism. This advantage is obtained because dichroic films are not formed on the interface surfaces 331 and 332 between the protruding portions.

Furthermore, since the exposed surfaces 311, 321, 312, and 322 are not provided with a dichroic film in the above-described embodiment, assembly precision can be improved by assembling the dichroic prism 200 with reference to the exposed surfaces.

B. Second Embodiment

Figure 4:
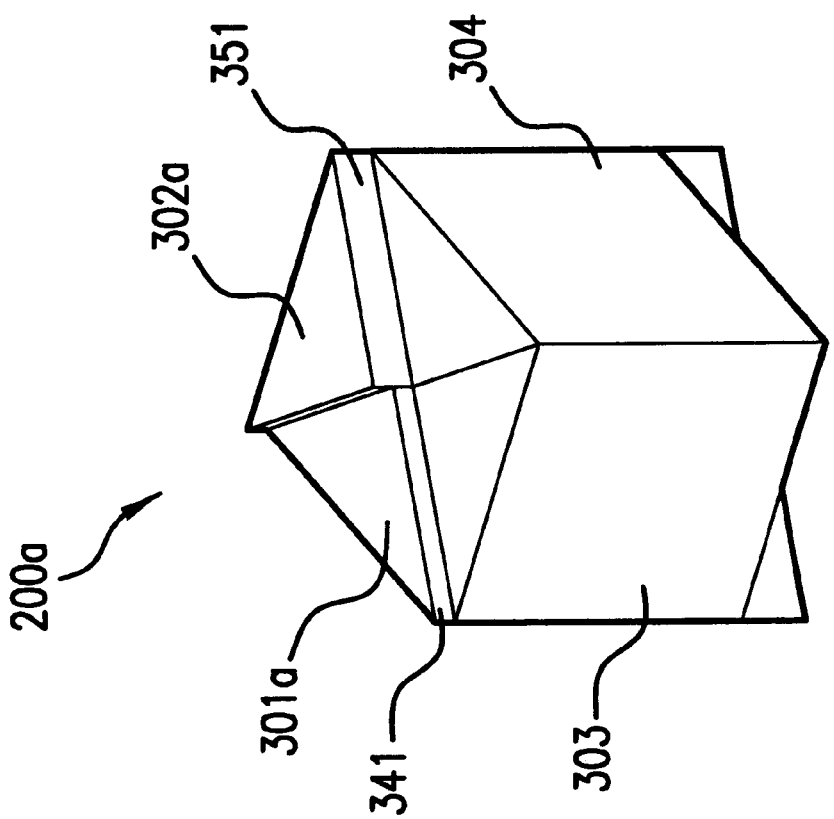
FIG. 4 is a perspective view of a dichroic prism 200a according to a second embodiment of the present invention.

FIG. 4 is a perspective view of a dichroic prism 200a according to a second embodiment of the present invention. The dichroic prism 200a is different from the first embodiment shown in FIGS. 1(A) and 1(B) in that long rectangular prisms 301a and 302a are vertically shifted from each other by a predetermined amount.

Figure 5A:
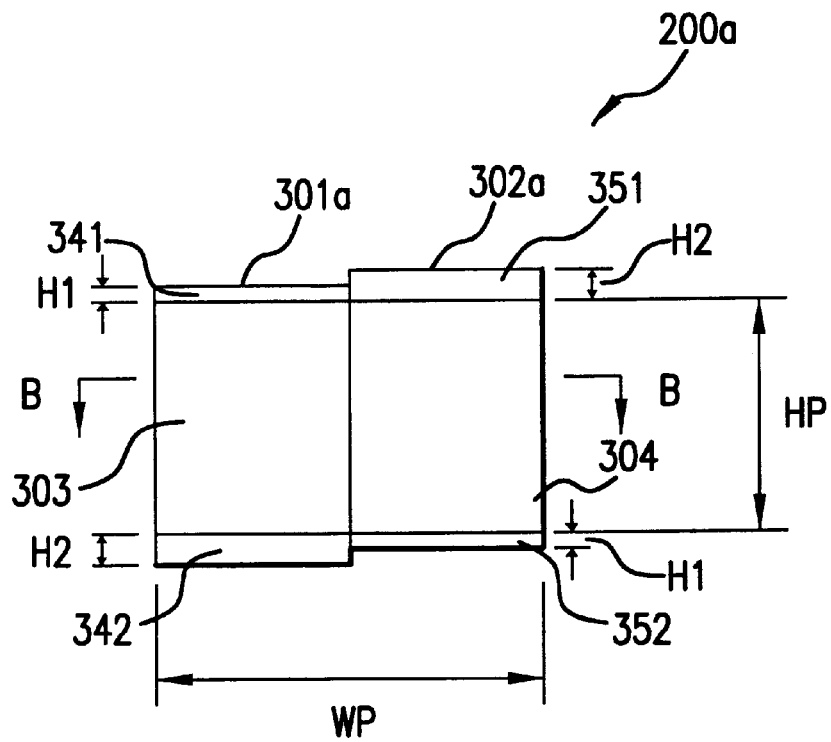
FIGS. 5(A) and 5(B) are a front view of the dichroic prism 200a of the second embodiment, and a cross-sectional view taken along line B—B in the front view.
Figure 5B:
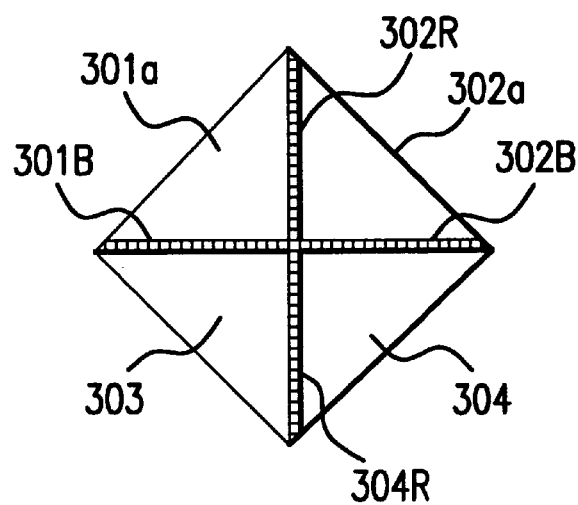

FIG. 5(A) is a front view of the dichroic prism 200a of the second embodiment having a width WP, and FIG. 5(B) is a cross-sectional view taken along line B—B of FIG. 5(A). An upward protrusion length H1 of the first rectangular prism 301a (i.e., the height of an exposed surface 341) is equal to the downward protrusion length of the second rectangular prism 302a (i.e., the height of an exposed surface 352). Furthermore, a downward protrusion length H2 of the first rectangular prism 301a (the height of an exposed surface 342) is equal to the upward protrusion length of the second rectangular prism 302a (the height of an exposed surface 351). When the long rectangular prisms 301a and 302a are thus shifted from each other in the longitudinal direction, it is easy to precisely position the center axis of the dichroic prism 200a in mounting the dichroic prism 200a in an optical apparatus such as a projection display apparatus. In addition, it is easy to position the reflecting surfaces of dichroic films in the same plane.

Figure 6A:
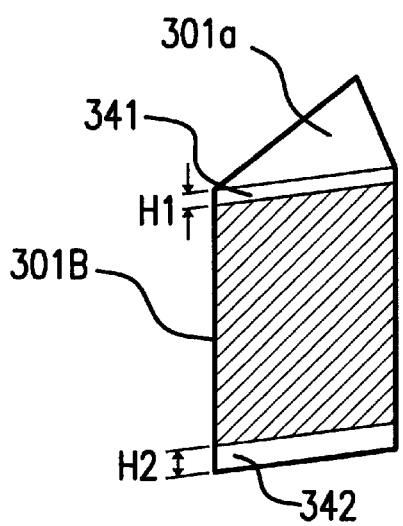
FIGS. 6(A) to 6(D) are perspective views of four rectangular prisms 301a, 302a, 303, and 304 that constitute the dichroic prism 200a of the second embodiment.
Figure 6B:
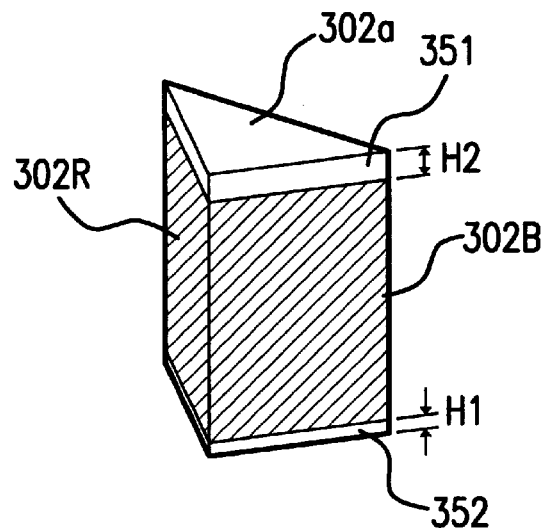
Figure 6C:
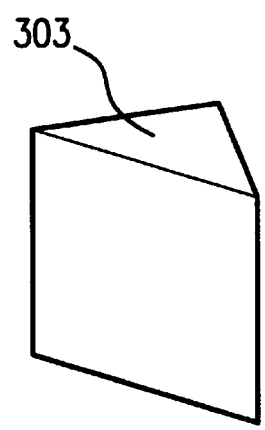
Figure 6D:
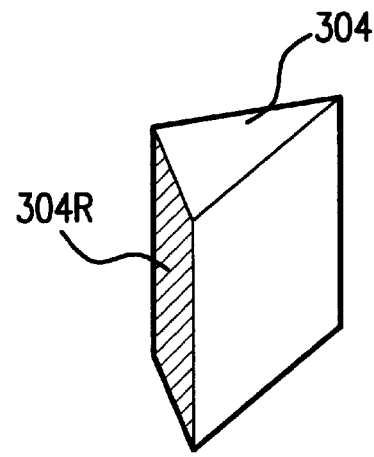

FIGS. 6(A) to 6(D) are perspective views of four rectangular prisms 301a, 302a, 303, and 304 that constitute the dichroic prism 200a of the second embodiment. The long rectangular prism pair 301a and 302a shown in FIGS. 6(A) and 6(B) are different from those shown in FIGS. 3(A) and 3(B) only in the positions where reflecting films (dichroic films) are formed.

Figure 7:
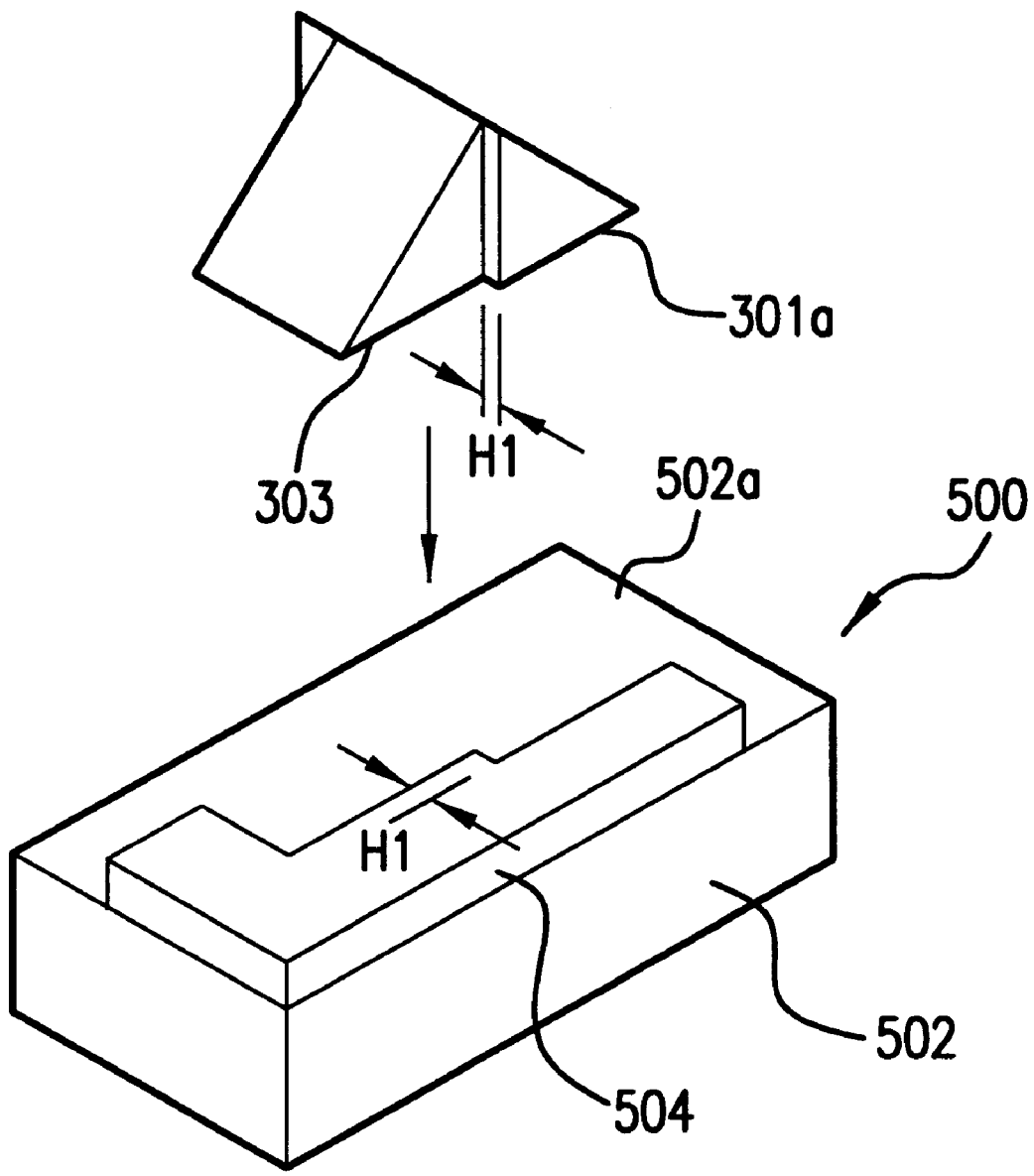
FIG. 7 is an explanatory view showing a process of bonding the first rectangular prism 301a and the third rectangular prism 303.

FIG. 7 is an explanatory view showing the process of combining the first rectangular prism 301a and the third rectangular prism 303. The combination is performed by using a first assembly jig 500. The first assembly jig 500 includes a base 502 having a flat surface 502a, and a height difference setting member 504 fixed on the base 502. In the height difference setting member 504, a height difference H1 that corresponds to a height difference H1 between the two rectangular prisms 301a and 303 is formed with high accuracy.

In combining the two rectangular prisms 301a and 303, first, an adhesive is applied onto their surfaces to be bonded. Then, air bubbles in the adhesive are removed by rubbing the two prisms together. After that, as shown in FIG. 7, the two prisms 301a and 303 are laid on the base 502. At this time, the prisms 301a and 303 are pressed against the height difference setting member 504 so that the height difference between the prisms is equal to the height difference H1 of the height difference setting member 504. This makes it possible to set the height difference between the prisms with high precision.

The bottom surfaces of the two rectangular prisms 301a and 303 shown in FIG. 7 are not provided with any dichroic films, and are formed with ground surfaces. Since the surface 502a of the base 502 is formed with a high-precision flat surface, it is possible to obtain a high degree of flatness with respect to one plane formed by the two rectangular prisms.

After the relative positional relationship between the two rectangular prisms 301a and 303 is thus precisely set, the adhesive applied on the bonded surfaces is solidified. As a result, it is possible to obtain the rectangular prism pair 301a and 303 in a combination of high precision.

Figure 8:
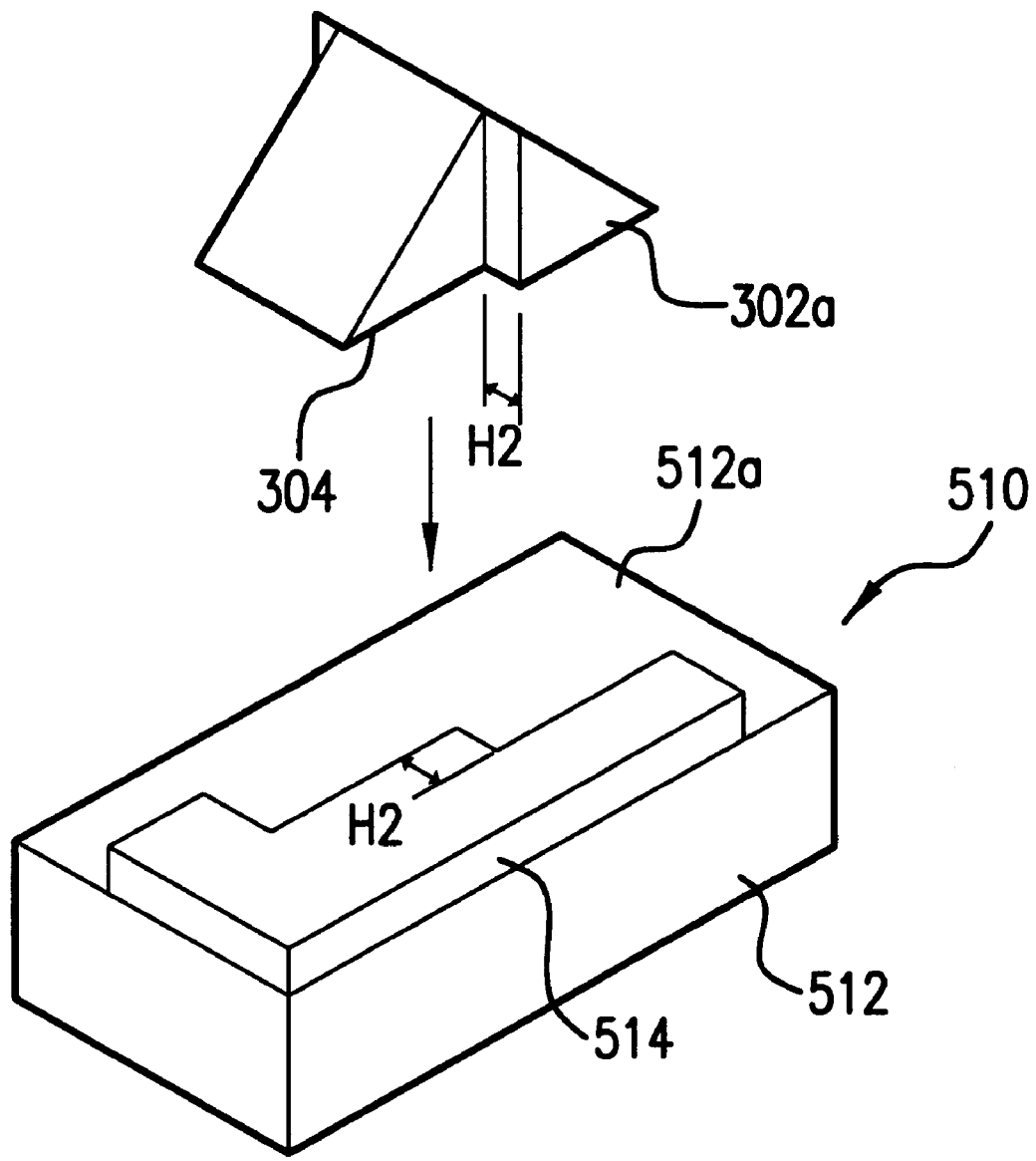
FIG. 8 is an explanatory view showing a process of bonding the second rectangular prism 302a and the fourth rectangular prism 304.

FIG. 8 is an explanatory view showing the process of bonding the second rectangular prism 302a and the fourth rectangular prism 304. A second assembly jig 510 to be used at this time includes a base 512 and a height difference setting member 514 in the same manner as the first assembly jig 500. The second assembly jig 510 is different from the first assembly jig 500 only in that a height difference H2 of the height difference setting member 514 is set at a value equivalent to a height difference H2 between the two rectangular prisms 302a and 304. The assembly method is similar to the method for the first rectangular prism 301a and the third rectangular prism 303 mentioned with reference to FIG. 7.

The bottom surfaces of the two rectangular prisms 302a and 304 shown in FIG. 8 are provided with red reflecting films, respectively. Since a surface 512a of the base 512 is formed in a high-precision flat surface, it is possible to obtain a high degree of flatness with respect to a red reflecting plane formed by the red reflecting films of the two rectangular prisms 302a and 304.

Comparing lights of two colors, red and blue, to be reflected by the reflecting plane, the red light has the higher spectral luminous efficiency (that is, it is more visible to the naked eye). Therefore, it is preferable that the plane to be formed by the red reflecting films be as even as possible. According to the assembly method of this embodiment, the assembling can be performed so that the red reflecting films 302R and 304R shown in FIGS. 6(B) and 6(D) precisely form one plane, and therefore, it is possible to produce an excellent dichroic prism in this aspect. Since the spectral luminous efficiencies of green, red, and blue decrease in this order, when green reflecting films are used instead of the red reflecting films or the blue reflecting films, it is preferable that the assembling is performed by this assembly method so that the green reflecting films form one plane.

Figure 9A:
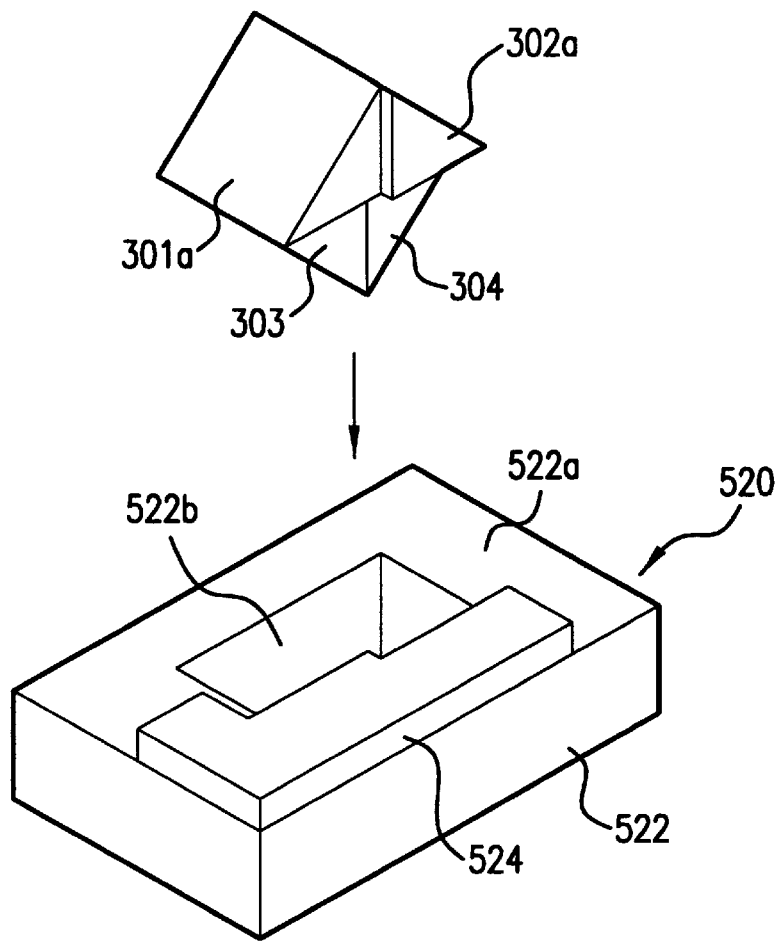
FIGS. 9(A) and 9(B) are explanatory views showing a method of assembling two bonded prisms made according to the processes shown in FIGS. 7 and 8.
Figure 9B:
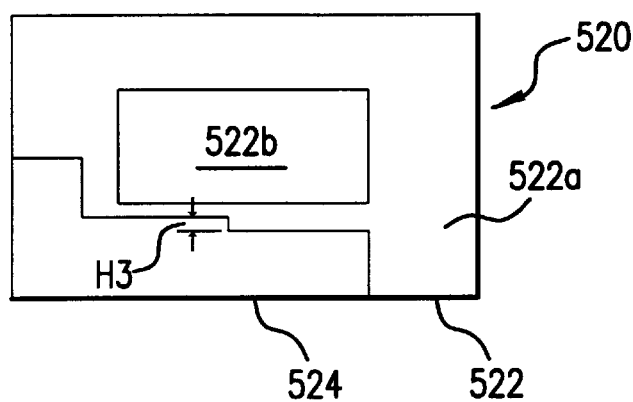

FIGS. 9(A) and 9(B) are explanatory views showing the process of bonding two bonded prisms that are produced according to the processes shown in FIGS. 7 and 8. This assembly process uses a third assembly jig 520. FIG. 9(B) is a plan view of the third assembly jig 520. The third assembly jig 520 includes a base 522 having a rectangular opening 522b at about the center, and a height difference setting member 524 fixed on a surface 522a of the base 522. The dimensions of the opening 522b are set so that the short rectangular prism pair 303 and 304 are completely held inside thereof and both ends of the long rectangular prism pair 301a and 302a in the longitudinal direction are outside thereof.

A height difference H3 of the height difference setting member 524 is set at a value equal to the difference between the height difference H1 of the bonded prism shown in FIG. 7 and the height difference H2 of the bonded prism shown in FIG. 8 (H2−H1).

In bonding the two bonded prisms together, an adhesive is applied onto their surfaces to be bonded, and the two bonded prisms are laid on the third assembly jig 520 so that the short rectangular prism pair 303 and 304 are held inside the opening 522b, as shown in FIG. 9(A). Then, the height difference between the long rectangular prism pair 301a and 302a is made equal to the height difference H3 of the height difference setting member 524 by pressing the long rectangular prism pair 301a and 302a against the height difference setting member 524. As a result, it is possible to set the height difference between the rectangular prisms 301a and 302a with high precision.

Only the protruding portions of the rectangular surfaces of the two rectangular prisms 301a and 302a which are not provided with reflecting films (341, 342, 351, and 352 shown in FIGS. 6(A) and 6(B)) are in contact with the surface 522a of the base 522. Since these protruding portions 341, 342, 351, and 352 are ground surfaces, it is possible to obtain a high degree of flatness with respect to these ground surfaces by placing these protruding portions 341, 342, 351, and 352 on the surface 522a of the base 522. As shown in FIGS. 6(A) and 6(B), the ground surface (adhesive surface) that is flush with the protruding portions 341 and 342 is provided with the blue reflecting film 301B, and the ground surface (adhesive surface) that is flush with the protruding portions 351 and 352 is also provided with the blue reflecting film 302B. Therefore, by assembling the rectangular prisms as shown in FIGS. 9(A) and 9(B), a high degree of flatness can be obtained with respect to the blue reflecting plane formed by the blue reflecting films 301B and 302B.

After the relative positional relationship between the two bonded prisms is precisely set, the adhesive applied on the bonded surfaces is solidified. As a result, it is possible to obtain the precisely combined dichroic prism 200a (FIG. 4). When an ultraviolet-curing adhesive is used as the adhesive for bonding the four rectangular prisms, it is possible to reduce the curing time and the heat to be generated during curing.

Figure 10A:
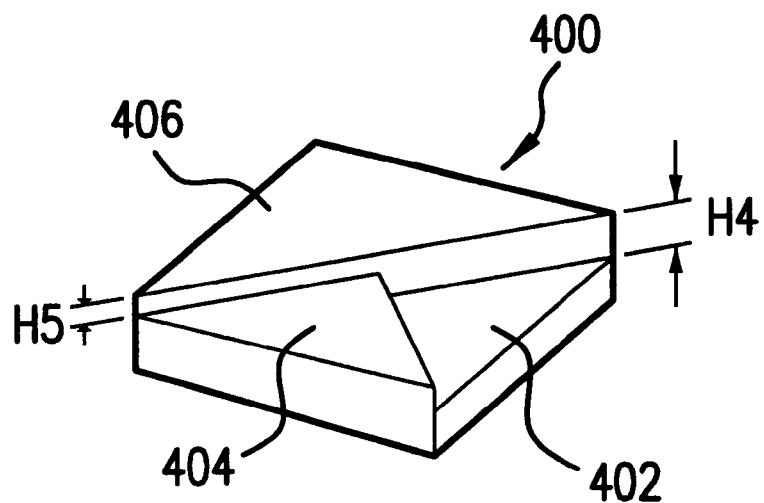
FIGS. 10(A) and 10(B) are perspective views of a prism stand 400 used in the dichroic prism.
Figure 10B:
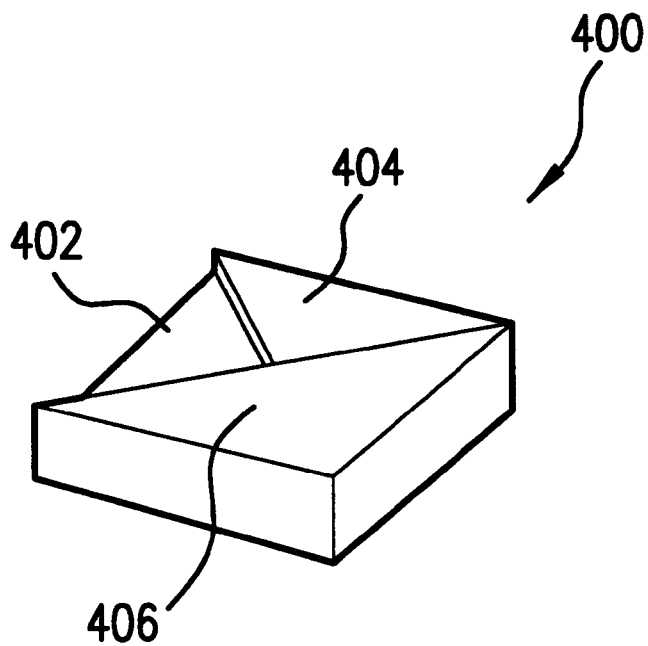

FIG. 10(A) is a perspective view of a prism stand 400 for mounting the dichroic prism 200a thereon, viewed from the front side, and FIG. 10(B) is a perspective view of the prism stand 400, viewed from the opposite side. This prism stand 400 has an external shape of a square when viewed in plan, and comprises first and second triangular stands 402 and 404 having a right-angled triangular shape that are each one-fourth of the external shape, and a third triangular stand 406 having a right-angled triangular shape that is half the external shape. The third triangular stand 406 is the highest of the three triangular stands. The first triangular stand 402 is lower than the third triangular stand 406 by H4. This height difference H4 is almost equal to the downward protrusion length H2 of the first rectangular prism 301a from the short rectangular prism pair 303 and 304, as shown in FIG. 5(A). The second triangular stand 404 is lower than the third triangular stand 406 by H5. This height difference H5 is almost equal to the upward protrusion length H1 of the first rectangular prism 301a from the short rectangular prism pair 303 and 304, as shown in FIG. 5(A).

Figure 11A:
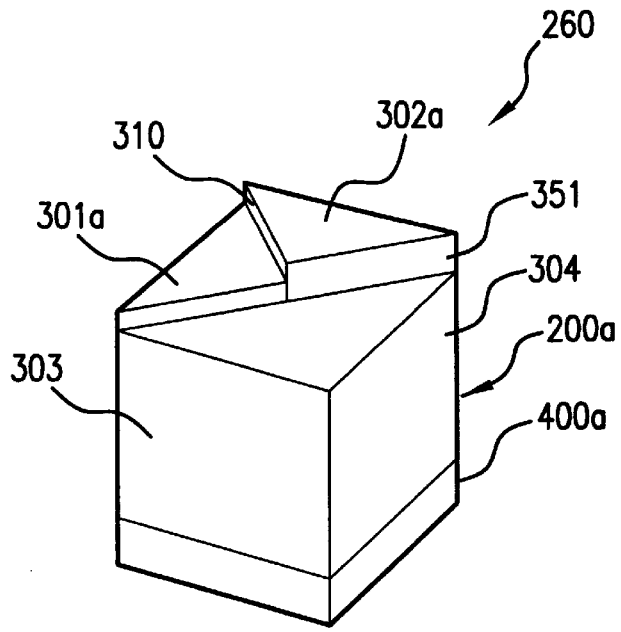
FIGS. 11(A) to 11(C) are explanatory views of a prism unit 260 employed in a projection display apparatus.

In utilizing the dichroic prism 200a in an optical apparatus such as a projection display apparatus, preferably, the dichroic prism 200a and the prism stand 400 are combined into the prism unit shown in FIG. 11(A) by bonding the bottom surface of the dichroic prism 200a to the prism stand 400, and the dichroic prism 200a is fixed inside the optical apparatus through the prism stand 400. Since the prism stand 400 is flat at the bottom, it can be easily fixed inside the optical apparatus by using screws or the like. It is preferable to use resin or metal as the material of the prism stand in consideration of costs and ease of shaping. The use of a resin or metal prism stand creates a concern that the prism stand is apt to be deformed by heat and the dichroic prism 200a in the optical apparatus may be displaced due to the deformation. When the bottom surface of a corresponding rectangular prism of the dichroic prism 200a is bonded to only one of the first to third triangular stands 402, 404, and 406 of the prism stand 400, however, the dichroic prism 200a is relatively resistant to displacement even if the prism stand 400 undergoes thermal deformation. In particular, when the rectangular prism 301a is bonded only to the first triangular stand 402, or when the rectangular prism 302a is bonded only to the second triangular stand 404, since the area of the bonded surface is small, it is possible to minimize the influence of thermal deformation of the prism stand.

In using the dichroic prism 200 shown in FIGS. 1(A) and 1(B) according to the first embodiment, a prism stand having a step portion that corresponds to the step portion at the bottom of the dichroic prism 200 is used.

Figure 11B:
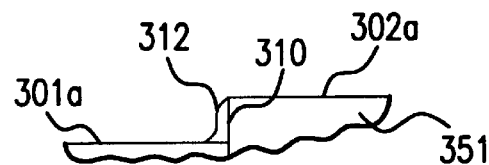
Figure 11C:
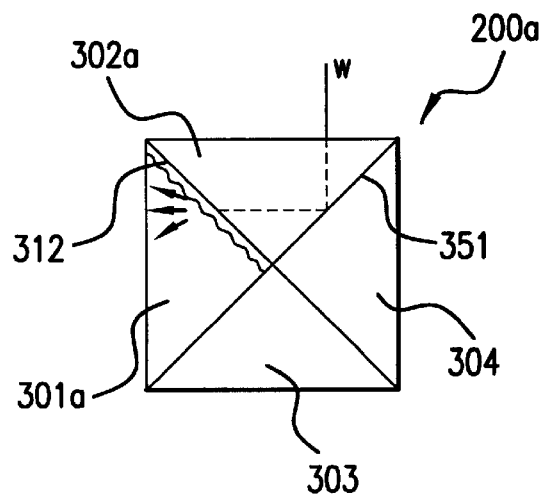

FIG. 11(B) is an enlarged view showing the step portion formed by the upward protruding portions of the long rectangular prism pair 301a and 302a. A part 310 of the rectangular surface of the second rectangular prism 302a is exposed above the first rectangular prism 301a. This exposed surface 310 is provided with an adhesive layer 312 serving as a light scattering layer. FIG. 11(C) is a horizontal sectional view of the dichroic prism 200a, taken at the exposed surface 310 of the second rectangular prism 302a, and illustrates the state in which return light W is irregularly reflected by the adhesive layer 312. The return light W, which returns from the light emitting surface side to the inside of the dichroic prism 200a, is totally reflected by the exposed surface 351 of the rectangular prism 302a, and then is irregularly reflected again by the adhesive layer 312 formed on another exposed surface 310. Therefore, it is possible to prevent the return light W from emitting again from the light emitting surface of the dichroic prism 200a.

Another light diffusing layer may be formed on the protruding portion 310 instead of the adhesive layer. For example, the exposed surface 310 may be made of ground glass. Similarly, it is preferable that the exposed surface 351 and the step portion at the bottom of the dichroic prism be provided with a light diffusing layer such as an adhesive layer, or be made of ground glass.

C. Configuration of Projection Display Apparatus

Figure 12:
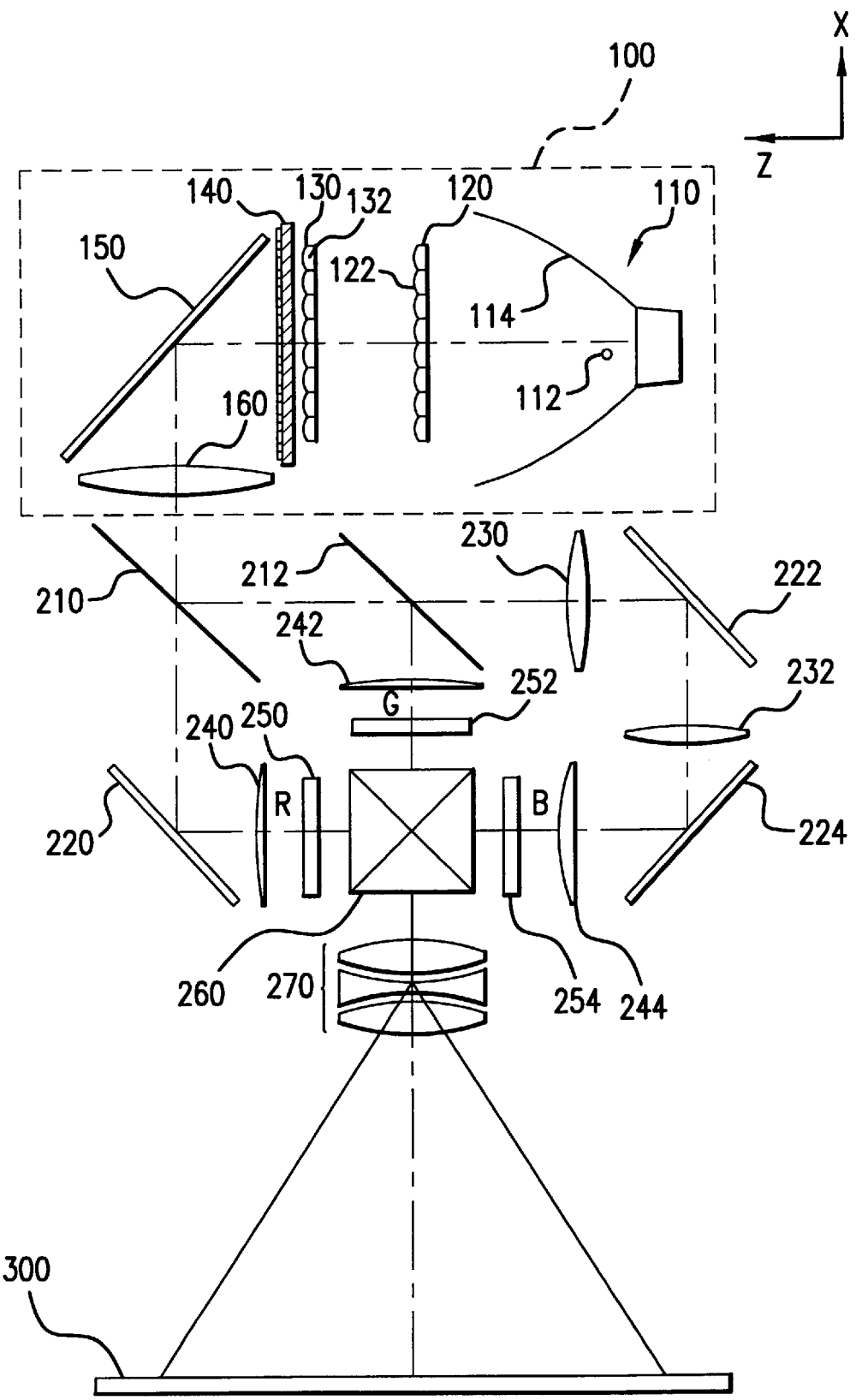
FIG. 12 is a schematic plan view showing the principal part of the projection display apparatus that utilizes the dichroic prism unit 260 according to the embodiment of the present invention.
Figure 13:
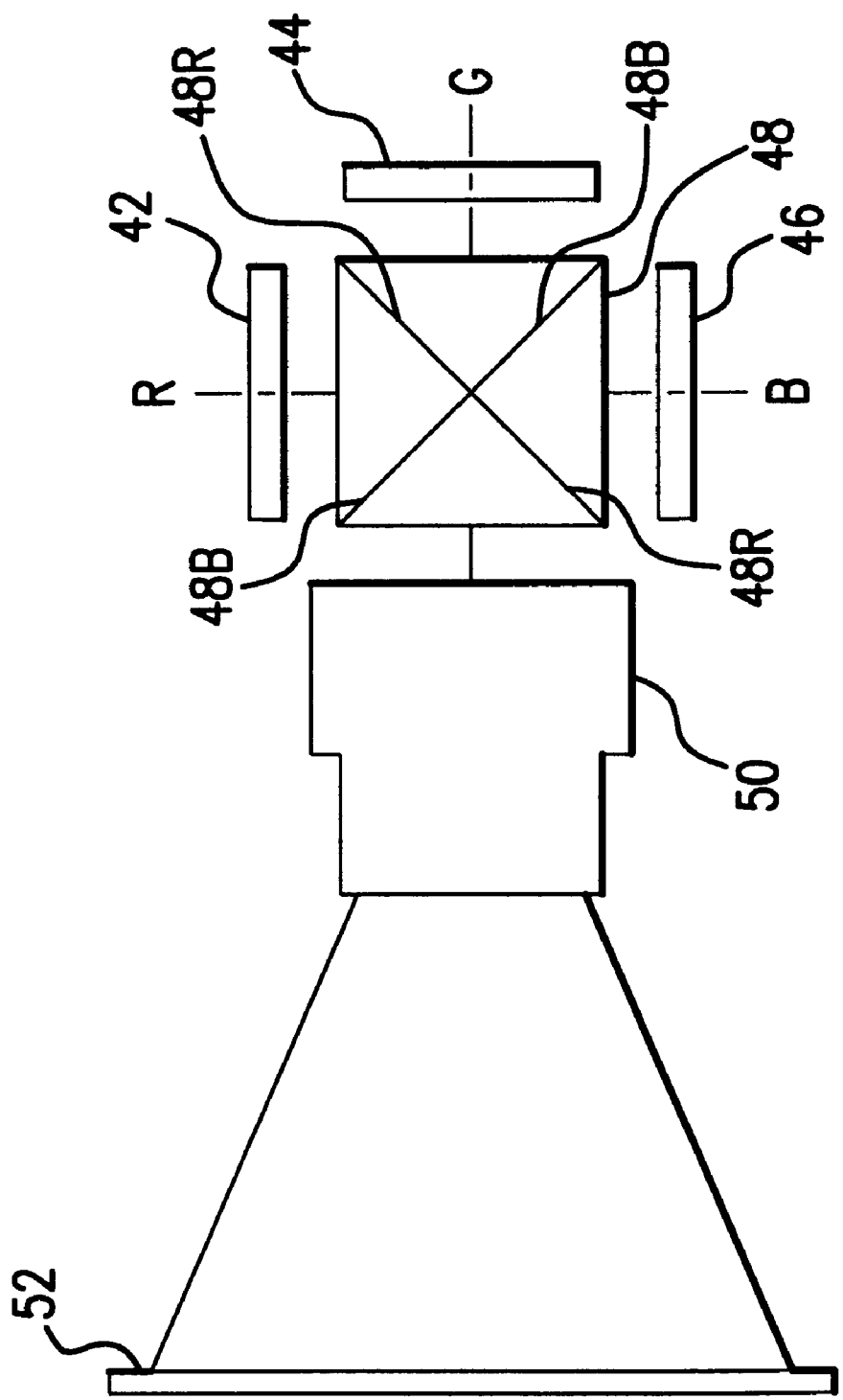
FIG. 13 is a conceptual view showing the principal part of a projection display apparatus.
Figure 14A:
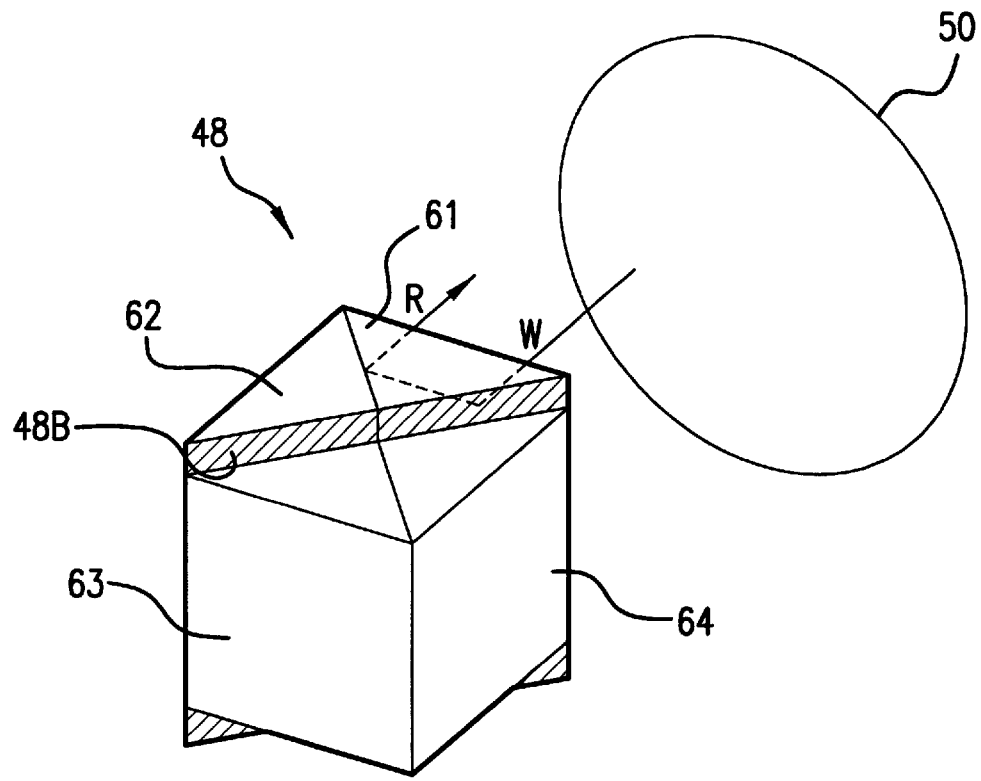
FIGS. 14(A) and 14(B) are explanatory views showing a problem of a conventional dichroic prism.
Figure 14B:
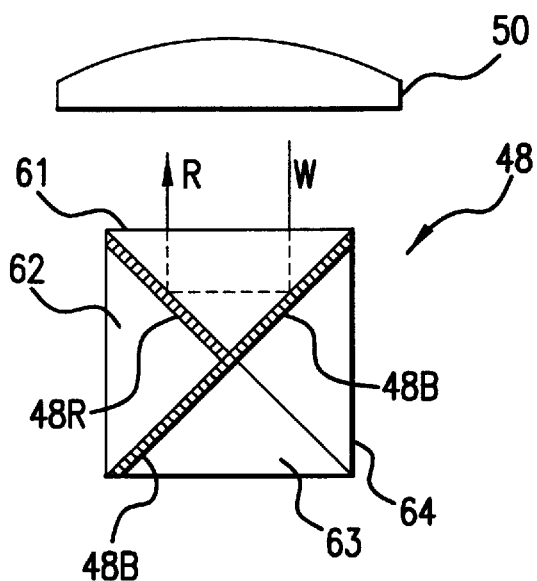

FIG. 12 is a schematic plan view showing the principal part of a projection display apparatus that utilizes the dichroic prism unit 260 according to the embodiment of the present invention. This projection display apparatus comprises an illumination optical system 100, dichroic mirrors 210 and 212, reflecting mirrors 220, 222, and 224, relay lenses 230 and 232, three field lenses 240, 242, and 244, three liquid crystal light valves (liquid crystal panels) 250, 252, and 254, the dichroic prism unit 260, and a projection lens system 270.

The illumination optical system 100 comprises a light source 110 for emitting an almost parallel beam, a first lens array 120, a second lens array 130, a polarizing conversion element 140 for converting incident light into a predetermined linearly polarized light component, a reflecting mirror 150, and a condenser lens 160. The illumination optical system 100 is an optical system for almost uniformly illuminating the three liquid crystal light valves 250, 252, and 254 that are regions to be illuminated.

The light source 110 comprises a source lamp 112 serving as a radiation source for emitting radial beams and a concave mirror 114 for emitting the radial light emitted from the source lamp 112 as an almost parallel beam. It is preferable to use a parabolic mirror as the concave mirror 114.

A parallel beam emitted from the light source 110 is split into a plurality of partial beams by the first and second lens arrays 120 and 130. Microlenses 122 of the first lens array 120 focus the partial beams near polarizing separation films of the polarizing conversion element 140. Microlenses 132 of the second lens array 130 have the function of focusing light source images in the first lens array 120 onto the liquid crystal light valves 250, 252, and 254. The partial beams emitted from the microlenses 132 of the second lens array 130 are reflected by the reflecting mirror 150. The condenser lens 160 functions as a superimposing optical system that superimposes and focuses these plurality of partial beams onto the liquid crystal light valves 250, 252, and 254 serving as regions to be illuminated. As a result, the liquid crystal light valves 250, 252, and 254 are illuminated almost uniformly.

The two dichroic mirrors 210 and 212 function as colored light separation means for separating white light condensed by the condenser lens 160 into colored lights of three colors, red, green, and blue. The first dichroic mirror 210 transmits a red light component of the white beam emitted from the illumination optical system 100, and reflects a blue light component and a green light component. The red light transmitted through the first dichroic mirror 210 is reflected by the reflecting mirror 220, and reaches the liquid crystal light valve for red light 250 through the field lens 240. The field lens 240 has the function of focusing the light source image near the second lens array 130 into the projection lens system 270. Furthermore, the partial beams passed through the field lens 240 are made into almost parallel beams. This also applies to the field lenses 242 and 244 located in front of the other liquid crystal light valves. The green light of the blue and green lights reflected by the first dichroic mirror 210 is reflected by the second dichroic mirror 212, passes through the field lens 242, and reaches the liquid crystal light valve for green light 252. On the other hand, the blue light passes through the second dichroic mirror 212 and a relay lens system including the relay lenses 230 and 232 and the reflecting mirrors 222 and 224, further passes through the field lens 244, and reaches the liquid crystal light valve for blue light 254. The relay lens system is provided for the blue light because the optical path length of the blue light is longer than those of the other colored lights.

The three liquid crystal light valves 250, 252, and 254 function as optical modulation means for forming images by modulating the colored lights of three colors according to given image information (image signals). The dichroic prism unit 260 functions as colored light synthesizing means for forming a color image by synthesizing the three colored lights. In the dichroic prism unit 260, a dielectric multilayer film for reflecting red light and a dielectric multilayer film for reflecting blue light are located in about the shape of an X on the interface surfaces among four rectangular prisms. The three colored lights are synthesized by these dielectric multilayer films, whereby a synthetic light for projecting a color image is formed. The synthetic light generated by the dichroic prism unit 260 is emitted toward the projection lens system 270. The projection lens system 270 functions as a projection optical system for projecting the synthetic light onto a projection screen 300, and thereby displaying a color image.

This projection display apparatus utilizes the prism unit 260 employing the dichroic prism according to the above-mentioned embodiment. Therefore, it is possible to prevent return light from the projection lens 270 to the dichroic prism from emitting again from the light emitting surface of the dichroic prism. As a result, it is possible to prevent an image to be projected on the projection screen 300 from being affected by the return light, and to thereby project a clear image.

The present invention is not limited to the above-mentioned embodiments and forms, and may be embodied in various forms without departing from the spirit and scope thereof. For example, the following modifications are possible.

(1) While two of the four rectangular prisms for constituting the dichroic prism are longer than the other two rectangular prisms in the above embodiments, the present invention is not limited to such a structure, and is applicable to a case in which at least one rectangular prism is longer than the other rectangular prisms. Furthermore, the present invention is applicable to a case in which four rectangular prisms of equal length are bonded while being in a state shifted from one another in the longitudinal direction.

(2) While two relatively long rectangular prisms are equal in length in the above embodiments, they may be different in length. When the two relatively long rectangular prisms are different from each other in length, it is easy to discriminate between the top and bottom of the dichroic prism. Furthermore, two relatively short rectangular prisms may be different in length.

(3) Various types of placements and structures of dichroic films in the dichroic prism are possible besides those of the above embodiments. For example, a green reflecting film may be provided instead of the blue reflecting film.

(4) While the present invention applies to a transmissive projection display apparatus in the above embodiments, it is also applicable to a reflective projection display apparatus. The "transmissive" type means that optical modulation means such as a liquid crystal light valve transmits light, and the "reflective" type means that the optical modulation means reflects light. In the reflective projection display apparatus, the dichroic prism is utilized as colored-light separation means for separating white light into lights of three colors, red, green, and blue, and is also utilized as colored light synthesizing means for synthesizing again and emitting the modulated three colored lights in the same direction. Even when the present invention applies to the reflective projection display apparatus, it is possible to obtain almost the same advantages as those of the transmissive projection display apparatus.

(5) While irregular reflection is given as an example of light scattering in the above embodiments, light may be uniformly scattered instead of being irregularly reflected.

What is claimed is:

1. A dichroic prism comprising:
   four rectangular prisms, each rectangular prism having rectangular surfaces bonded to rectangular surfaces of adjacent rectangular prisms, a first surface part of at least one of said four rectangular prisms protruding from the rectangular surfaces of other ones of said rectangular prisms, and
   a dichroic film formed on a second surface part of said at least one rectangular prism, said second surface part not protruding from said rectangular surfaces of said other ones of said rectangular prisms.

2. The dichroic prism according to claim 1, said first surface part being provided with a light diffusing layer for diffusing light.

3. The dichroic prism according to claim 2, said light diffusing layer being an adhesive layer.

4. The dichroic prism according to claim 2, said light diffusing layer being a ground glass layer.

5. A dichroic prism comprising:
   four rectangular prisms, each rectangular prism having rectangular surfaces bonded to rectangular surfaces of adjacent rectangular prisms, a first surface part of a first rectangular prism pair composed of two adjoining rectangular prisms of said four rectangular prisms protruding from a rectangular surface of a second rectangular prism pair in a longitudinal direction, and
   a dichroic film formed on a second surface part of said first rectangular prism pair, said second surface part not protruding from said rectangular surfaces of said second rectangular prism pair of said rectangular prisms.

6. The dichroic prism according to claim 5, said two adjoining rectangular prisms in said first rectangular prism pair being in a state shifted from each other in the longitudinal direction so that they form a step.

7. A prism unit, comprising:
   a dichroic prism composed of four rectangular prisms, each rectangular prism having rectangular surfaces bonded to rectangular surfaces of adjacent rectangular prisms, a first surface part of at least one of said four rectangular prisms protruding from the rectangular surfaces of other ones of said rectangular prisms, and a dichroic film formed on a second surface part of said at least one rectangular prism, said second surface part not protruding from said rectangular surfaces of said other ones of said rectangular prisms; and
   a prism stand for mounting said dichroic prism thereon, said prism stand having a step that matches a step of said dichroic prism.

8. The prism unit according to claim 7, said first surface part being provided with a light diffusing layer for diffusing light.

9. The prism unit according to claim 8, said light diffusing layer being an adhesive layer.

10. The prism unit according to claim 8, said light diffusing layer being a ground glass layer.

11. A projector, comprising:
    an illumination optical system for emitting illumination light;
    colored light separation means for separating the illumination light into lights of three colors;
    three light modulation means for modulating the three colored lights based on a given image signal;
    a dichroic prism composed of four rectangular prisms, each rectangular prism having rectangular surfaces bonded to rectangular surfaces of adjacent rectangular prisms, a first surface part of at least one of said four rectangular prisms protruding from the rectangular surfaces of other ones of said rectangular prisms, and a dichroic film formed on a second surface part of said at least one rectangular prism, said second surface part not protruding from said rectangular surfaces of said other ones of said rectangular prisms; and
    a projection optical system for projecting the lights synthesized by said dichroic prism.

12. The projector according to claim 11, said first surface part being provided with a light diffusing layer for diffusing light.

13. The projector according to claim 12, said light diffusing layer being an adhesive layer.

14. The projector according to claim 12, said light diffusing layer being a ground glass layer.

15. A prism unit, comprising:
    a dichroic prism composed of four rectangular prisms, each rectangular prism having rectangular surfaces bonded to rectangular surfaces of adjacent rectangular prisms, a first surface part of a first rectangular prism pair composed of two adjoining rectangular prisms of said four rectangular prisms protruding from a rectangular surface of a second rectangular prism pair in a longitudinal direction, and a dichroic film formed on a second surface part of said first rectangular prism pair, said second surface part not protruding from said rectangular surfaces of said second rectangular prism pair of said rectangular prisms; and
    a prism stand for mounting said dichroic prism thereon, said prism stand having a step that matches a step of said dichroic prism.

16. The prism unit according to claim 15, said two adjoining rectangular prisms in said first rectangular prism pair being fixed in a state shifted from each other in the longitudinal direction so that they form the step of said dichroic prism.

17. A projector, comprising:
    an illumination optical system for emitting illumination light;
    colored light separation means for separating the illumination light into lights of three colors;

three light modulation means for modulating the three colored lights based on a given image signal;

a dichroic prism composed of four rectangular prisms, each rectangular prism having rectangular surfaces bonded to rectangular surfaces of adjacent rectangular prisms, a first surface part of a first rectangular prism pair composed of two adjoining rectangular prisms of said four rectangular prisms protruding from a rectangular surface of a second rectangular prism pair in a longitudinal direction, and a dichroic film formed on a second surface part of said first rectangular prism pair, said second surface part not protruding from said rectangular surfaces of said second rectangular prism pair of said rectangular prisms; and a projection optical system for projecting the lights synthesized by said dichroic prism.

18. The projector according to claim 17, said two adjoining rectangular prisms in said first rectangular prism pair being fixed in a state shifted from each other in the longitudinal direction so that they form a step.

19. A projection display method, comprising:

emitting an illumination light;

separating the illumination light into lights of three colors;

modulating the three colored lights based on a given image signal;

synthesizing the lights using a dichroic prism composed of four rectangular prisms, each rectangular prism having rectangular surfaces bonded to rectangular surfaces of adjacent rectangular prisms, a first surface part of at least one of said four rectangular prisms protruding from the rectangular surfaces of other ones of said rectangular prisms, and a dichroic film formed on a second surface part of said at least one rectangular prism, said second surface part not protruding from said rectangular surfaces of said other ones of said rectangular prisms; and projecting the lights synthesized by said dichroic prism.

20. A projection display method, comprising:

emitting an illumination light;

separating the illumination light into lights of three colors;

modulating the three colored lights based on a given image signal;

synthesizing the lights using a dichroic prism composed of four rectangular prisms, each rectangular prism having rectangular surfaces bonded to rectangular surfaces of adjacent rectangular prisms, a first surface part of a first rectangular prism pair composed of two adjoining rectangular prisms of said four rectangular prisms protruding from a rectangular surface of a second rectangular prism pair in a longitudinal direction, and a dichroic film formed on a second surface part of said first rectangular prism pair, said second surface part not protruding from said rectangular surfaces of said second rectangular prism pair of said rectangular prisms; and projecting the lights synthesized by said dichroic prism.

* * * * *